US011316851B2

(12) United States Patent
Sohail et al.

(10) Patent No.: US 11,316,851 B2
(45) Date of Patent: Apr. 26, 2022

(54) SECURITY FOR NETWORK ENVIRONMENT USING TRUST SCORING BASED ON POWER CONSUMPTION OF DEVICES WITHIN NETWORK

(71) Applicant: EMC IP Holding Company LLC, Hopkinton, MA (US)

(72) Inventors: Mohamed Sohail, Sheikh Zayed (EG); Said Tabet, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 441 days.

(21) Appl. No.: 16/446,278

(22) Filed: Jun. 19, 2019

(65) Prior Publication Data
US 2020/0403991 A1  Dec. 24, 2020

(51) Int. Cl.
*H04L 9/40* (2022.01)
*H04L 29/06* (2006.01)
*G06N 20/00* (2019.01)
*G06F 1/28* (2006.01)

(52) U.S. Cl.
CPC ............ *H04L 63/0876* (2013.01); *G06F 1/28* (2013.01); *G06N 20/00* (2019.01); *H04L 63/105* (2013.01)

(58) Field of Classification Search
CPC .............. H04L 63/0876; H04L 63/105; H04L 63/1433; G06F 1/28; G06N 20/00
See application file for complete search history.

(56) References Cited

U.S. PATENT DOCUMENTS

| 7,877,621 | B2 | 1/2011 | Jacoby et al. |
| 8,316,237 | B1 | 11/2012 | Felsher et al. |
| 8,543,247 | B2 | 9/2013 | Boss et al. |
| 8,769,355 | B2 | 7/2014 | Scott |
| 8,779,921 | B1 | 7/2014 | Curtiss |

(Continued)

FOREIGN PATENT DOCUMENTS

WO    2012061663 A2    5/2012

OTHER PUBLICATIONS

H. Bai et al., "Wireless Sensor Network for Aircraft Health Monitoring," China Communications, Feb. 2005, pp. 70-77.

(Continued)

*Primary Examiner* — Thaddeus J Plecha
(74) *Attorney, Agent, or Firm* — Ryan, Mason & Lewis, LLP

(57) ABSTRACT

Systems, methods, and articles of manufacture comprising processor-readable storage media are provided for implementing security mechanisms for network environments. For example, a method includes collecting power consumption data of a plurality of devices operating within a network and determining trust scores for the plurality of devices based, at least in part, on the collected power consumption data. The trust score for a device provides a measure of trustworthiness of the device exhibiting normal operating behavior within the network. Each device is assigned to one of a plurality of trust tiers based on the determined trust scores, wherein each trust tier specifies an authentication level for devices assigned to the trust tier. One or more authentication procedures are applied to authenticate a given device operating within the network based on the authentication level specified by the trust tier to which the given device is assigned.

20 Claims, 8 Drawing Sheets

(56) References Cited

U.S. PATENT DOCUMENTS

| | | | |
|---|---|---|---|
| 9,020,802 | B1 | 4/2015 | Florissi et al. |
| 9,031,992 | B1 | 5/2015 | Florissi et al. |
| 9,154,948 | B2 | 10/2015 | Khare et al. |
| 9,158,843 | B1 | 10/2015 | Florissi et al. |
| 9,268,938 | B1 | 2/2016 | Aguayo Gonzalez et al. |
| 9,361,175 | B1 | 6/2016 | Bose et al. |
| 9,503,422 | B2 | 11/2016 | Al-Khowaiter et al. |
| 9,509,707 | B2 | 11/2016 | Patne et al. |
| 9,860,257 | B1* | 1/2018 | Kumar ............... H04L 63/1458 |
| 10,057,264 | B1 | 8/2018 | Elnakib et al. |
| 10,097,572 | B1 | 10/2018 | Sohail et al. |
| 2004/0010699 | A1 | 1/2004 | Shao et al. |
| 2005/0076198 | A1 | 4/2005 | Skomra et al. |
| 2005/0228916 | A1 | 10/2005 | Telesco |
| 2006/0020784 | A1 | 1/2006 | Jonker et al. |
| 2006/0026683 | A1 | 2/2006 | Lim |
| 2007/0113225 | A1 | 5/2007 | Felts |
| 2008/0028453 | A1* | 1/2008 | Nguyen ............... H04L 63/102 726/9 |
| 2008/0091975 | A1 | 4/2008 | Kladko et al. |
| 2012/0089514 | A1 | 4/2012 | Kraemling et al. |
| 2013/0159550 | A1 | 6/2013 | Vasseur |
| 2013/0304652 | A1 | 11/2013 | Onda et al. |
| 2014/0020075 | A1 | 1/2014 | Bhagavatula et al. |
| 2014/0215207 | A1 | 7/2014 | Datta et al. |
| 2014/0230055 | A1 | 8/2014 | Boehl |
| 2014/0244836 | A1 | 8/2014 | Goel et al. |
| 2014/0277801 | A1 | 9/2014 | Cioraca et al. |
| 2014/0286354 | A1 | 9/2014 | Van De Poel et al. |
| 2015/0007273 | A1 | 1/2015 | Lin |
| 2015/0039882 | A1 | 2/2015 | Watanabe |
| 2015/0180894 | A1 | 6/2015 | Sadovsky et al. |
| 2015/0195296 | A1 | 7/2015 | Vasseur et al. |
| 2015/0229654 | A1 | 8/2015 | Perier |
| 2015/0310195 | A1 | 10/2015 | Bailor et al. |
| 2015/0317475 | A1 | 11/2015 | Aguayo Gonzalez et al. |
| 2016/0014158 | A1 | 1/2016 | Schrecker et al. |
| 2016/0037436 | A1 | 2/2016 | Spencer et al. |
| 2016/0050279 | A1 | 2/2016 | Pahng |
| 2016/0078230 | A1 | 3/2016 | Silverstone |
| 2016/0080406 | A1 | 3/2016 | Sadovsky et al. |
| 2016/0112374 | A1 | 4/2016 | Branca |
| 2016/0173511 | A1 | 6/2016 | Bratspiess et al. |
| 2016/0261465 | A1 | 9/2016 | Gupta et al. |
| 2016/0337127 | A1 | 11/2016 | Schultz et al. |
| 2017/0005808 | A1 | 1/2017 | Gunti et al. |
| 2017/0093907 | A1 | 3/2017 | Srivastava |
| 2017/0096123 | A1 | 4/2017 | Gennermann et al. |
| 2017/0134173 | A1 | 5/2017 | Kern et al. |
| 2017/0180380 | A1 | 6/2017 | Bagasra |
| 2017/0300716 | A1* | 10/2017 | Reisgies ............ G06F 21/6245 |
| 2017/0310482 | A1 | 10/2017 | Reed et al. |
| 2017/0331831 | A1* | 11/2017 | Park .................... H04L 63/102 |
| 2017/0344047 | A1 | 11/2017 | Cioraca et al. |
| 2018/0054490 | A1 | 2/2018 | Wadhwa et al. |
| 2018/0167812 | A1 | 6/2018 | Nagarajamoorthy et al. |
| 2018/0275642 | A1 | 9/2018 | Tajima et al. |
| 2018/0332065 | A1* | 11/2018 | Gupta .................. H04W 12/08 |
| 2018/0337785 | A1 | 11/2018 | Sanciangco et al. |
| 2019/0207957 | A1* | 7/2019 | Espinosa ............ G06F 16/9538 |
| 2019/0207965 | A1* | 7/2019 | Espinosa ............ G06F 16/9538 |
| 2020/0259658 | A1* | 8/2020 | Libsch .................. G06F 21/72 |

OTHER PUBLICATIONS

Capgemini Consulting, "Securing the internet of Things Opportunity: Putting Cybersecurity at the Heart of the IoT," Sogeti High Tech, Feb. 12, 2015, 17 pages.

Sebastian Ong, "NFC Technology for Smart Wearables in the Payment and Transport Market," IOT Asia, Mar. 30, 2016, 27 pages.

U.S. Appl. No. 15/175,630 filed in the name of Mohamed Sohail et al., on Jun. 7, 2016 and entitled "Security for Network Computing Environment Based on Power Consumption of Network Devices."

U.S. Appl. No. 15/165,437 filed in the name of Eslam ElNakib et al. on May 26, 2016 and entitled "Analytics-Based internet of Things Security Platform."

Andy Patrizio, "IoT Security Issues: How to Secure the Network," http://www.datamation.com/security/iot-security-issues-how-to-secure-the-network.html, Jun. 7, 2016, 2 pages.

Searchsecurity, "Big Data Analytics: New Patterns Emerge for Security," http://searchsecurity.techtarget.com/feature/Big-data-analytics-New-patterns-emerge-for-security, Jun. 2013, 7 pages, vol. 15, No. 5.

GSM Association, "Understanding the internet of Things (IoT)," Connected Living, Jul. 2014, 15 pages.

Gartner'S, "Gartner's 2014 Hype Cycle for Emerging Technologies Maps the Journey to Digital Business," http://www.gartner.com/newsroom/id/2819918, Aug. 11, 2014, 5 pages.

Lynn Price, "Big Data and Actionable Analytics: Is it All Hype?" https://securityintelligence.com/big-data-and-actionable-analytics-is-it-all-hype/, Jun. 12, 2013, 4 pages.

IDC, "Market in a Minute: Internet of Things," http://wwww.ido.com/downloads/idc_market_in_a_minute_iot_infographic.pdf, 2014-2020, 1 page.

IEEE Standards Association, "P2413—Standard for an Architectural Framework for the Internet of Things (IoT)," https://standards.ieee.org/develop/project/2413.html, May 4, 2016, 1 page.

cisco.com, "Internet of Things (IoT)," http://www.cisco.com/c/en/us/solutions/internet-of-things/iot-products.html, May 4, 2016, 2 pages.

ISO/IEC JTC 1, "Internet of Things (IoT)," Preliminary Report, 2014, 17 pages.

abiresearch.com, "More Than 30 Billion Devices Will Wirelessly Connect to the Internet of Everything in 2020," https://www.abiresearch.com/press/more-than-30-billion-devices-will-wirelessiy-conne/, May 9, 2013, 1 page.

mfrontiers.com, "mFinity IoT," http://www.mfrontlers.com/mfinity-iot-overview/. May 18, 2016, 2 pages.

gartner.com, "IT Glossary," http://www.gartner.com/it-glossary/, May 4, 2016, 3 pages.

V.K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.

International Telecommunication Union, "Series Y: Global Information Infrastructure, Internet Protocol Aspects and Next-Generation Networks: Next Generation Networks—Frameworks and Functional Architecture Models," Recommendation ITU-T Y.2060, Jun. 2012, 22 pages.

The Security Ledger, "Pentagon Looks to Analog Monitoring to Secure IoT," Oct. 1, 2015, 7 pages.

Virta Laboratories Inc., "Virta Labs Introduces PowerGuard," http://www.eecs.umich.edu/eecs/about/articles/2015/VirtaLabs.html, Aug. 12, 2015, 2 pages.

N. Khalil et al., "Wireless Sensor Network for Internet of Things," https://arxiv.org/abs/1606.08407, Jun. 27, 2016, 6 pages.

O. Arias et al., "Privacy and Security in Internet of Things and Wearable Devices," IEEE Transactions on Multi-Scale Computing Systems, vol. 1, No. 2, Apr.-Jun. 2015, pp. 99-109.

Paul et al., "Centralized Security System Based on IoT," international Journal of Research in Advance Engineering, vol. 2, Issue 3, May-Jun. 2016, pp. 15-20.

Hewlett-Packard Corporation et al., "Advanced Configuration and Power Interface Specification," http://www.acpi.info, Nov. 13, 2013, 956 pages.

helpnetsecurity.com, "Internet of Everything Attack Surface Grows," http://www.helpnetsecurity.com/2015/04/16/internet-of-everything-attack-surface-grows/, Apr. 16, 2015, 2 pages.

H. Jung et al., "Performance Improvement and Power Consumption Reduction of an Embedded RISC Core," Journal of Information and Communication Convergence Engineering, vol. 10, Issue 1, Mar. 2012, pp. 78-84.

Minda Zetlin, "Internet of Hackable Things? Why IoT Devices Need Better Security," http://enterprisersproject.com/article/2016/2/internet-hackable-things-why-iot-devices-need-better-security, Feb. 8, 2016, 3 pages.

(56) References Cited

OTHER PUBLICATIONS

H. Bai et al., "Wireless Sensor Network for Aircraft Health Monitoring," Proceedings of the First International Conference on Broadband Networks, Aug. 12, 2004, 3 pages.

H. Mayadunna et al., "A Trust Evaluation Model for Online Social Networks," 2018 National Information Technology Conference, Oct. 2018, 6 pages.

* cited by examiner

SECURITY FOR NETWORK ENVIRONMENT USING TRUST SCORING BASED ON POWER CONSUMPTION OF DEVICES WITHIN NETWORK

FIELD

This disclosure relates generally to security techniques for network environments and, in particular, to techniques for anomalous activity detection in network environments such as wireless sensor networks.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, software-as-a-service (SaaS), infrastructure-as-a-service (IaaS), and/or platform-as-a-service (PaaS). Such cloud computing services are particularly useful for implementing Internet of Things eco-systems.

The Internet of Things (IoT) is a term that refers to a network computing environment in which physical things such as devices, objects, and other things, etc., are equipped with unique identifiers, network connectivity, and other embedded technologies, which allows such devices, objects, and things to sense, communicate, interact, and send/receive data over one or more communications networks (e.g., Internet, etc.) without requiring human-to-human or human-to-computer interaction. For an IoT application, a "thing" may include any object that can be assigned an IP address and have the capability to transfer data over a communications network.

IoT technology is considered to be a key enabler for many emerging and future "smart" applications and, consequently, there is expected to be an exponential increase in the number of network connected devices, objects, and autonomous things, which are connected over a communications network such as the Internet. For example, a "smart" IoT application can be implemented using a wireless sensor network (WSN) comprising a network of wireless sensor nodes that cooperatively sense and control a given application environment using machine-to-machine (M2M) communication. As a result of the expected exponential increase in the number of network connected devices for smart IoT applications, network security will become an increasingly problematic issue, especially for RFID (Radio Frequency Identification) networks and wireless networks which are being widely implemented.

SUMMARY

Exemplary embodiments include methods for implementing security mechanisms for network environments such as IoT ecosystems. For example, in one embodiment, a method comprises collecting power consumption data of a plurality of devices operating within a network, determining trust scores for the plurality of devices based, at least in part, on the collected power consumption data, wherein the trust score for a device provides a measure of trustworthiness of the device exhibiting normal operating behavior within the network, assigning each of the plurality of devices into one of a plurality of trust tiers based on the determined trust scores, wherein each trust tier specifies an authentication level for the devices assigned to the trust tier, and applying one or more authentication procedures to authenticate a given device of the plurality of devices operating within the network based on the authentication level specified by the trust tier to which the given device is assigned.

Other embodiments of the disclosure include, without limitation, computing systems and articles of manufacture comprising processor-readable storage media.

DETAILED DESCRIPTION

Exemplary embodiments will be now be described in further detail with regard to systems and methods for implementing security mechanisms for network environments such as wireless sensor networks. In particular, systems and methods are provided to detect anomalous activity in a network (e.g., a wireless sensor network) based on power consumption/usage of IoT devices (e.g., wireless sensor devices) within the network. As explained in further detail below, security mechanisms are implemented to collect and analyze power consumption information of IoT devices operating within a network, for example, to detect for possible vulnerabilities, security breaches, anomalous device behaviors, device malfunctions, etc., based on the power consumption information. In addition, exemplary embodiments of the disclosure comprise techniques to collect and process power consumption information of IoT devices operating within a network in conjunction with other types of network-related information regarding network activity, communication patterns between IoT devices within the network, behaviors of network devices, etc., to detect for vulnerabilities, security breaches, anomalous device behaviors, device malfunctions, etc., within a network of IoT devices.

In other embodiments, various types of information such as power consumption/usage of IoT devices, communication patterns between IoT devices, etc., are utilized to generate trust scores for the IoT devices. The trust score for a given device (e.g., IoT device) provides a quantitative measure or indication of how trustworthy the device is with regard to exhibiting normal behavior within a given network environment. Furthermore, in some embodiments, the trust scores of IoT devices are used to partition the IoT devices into different trust tiers, wherein the different trust tiers correspond to different levels of authentication that are to be utilized to authenticate the IoT devices operating within a given network environment.

The power consumption analysis and anomaly detection methods as discussed herein can be readily embodied as an add-on to existing network security solutions (e.g., anomaly detection, intrusion detection, etc.) to provide power consumption/usage information as an additional metric that is used in conjunction with other commonly used metrics (network activity, communication patterns between different IoT devices, behaviors of IoT devices, etc.) to detect for vulnerabilities, security breaches, anomalous device behaviors, device malfunctions, etc., within a network of devices.

Figure 1:
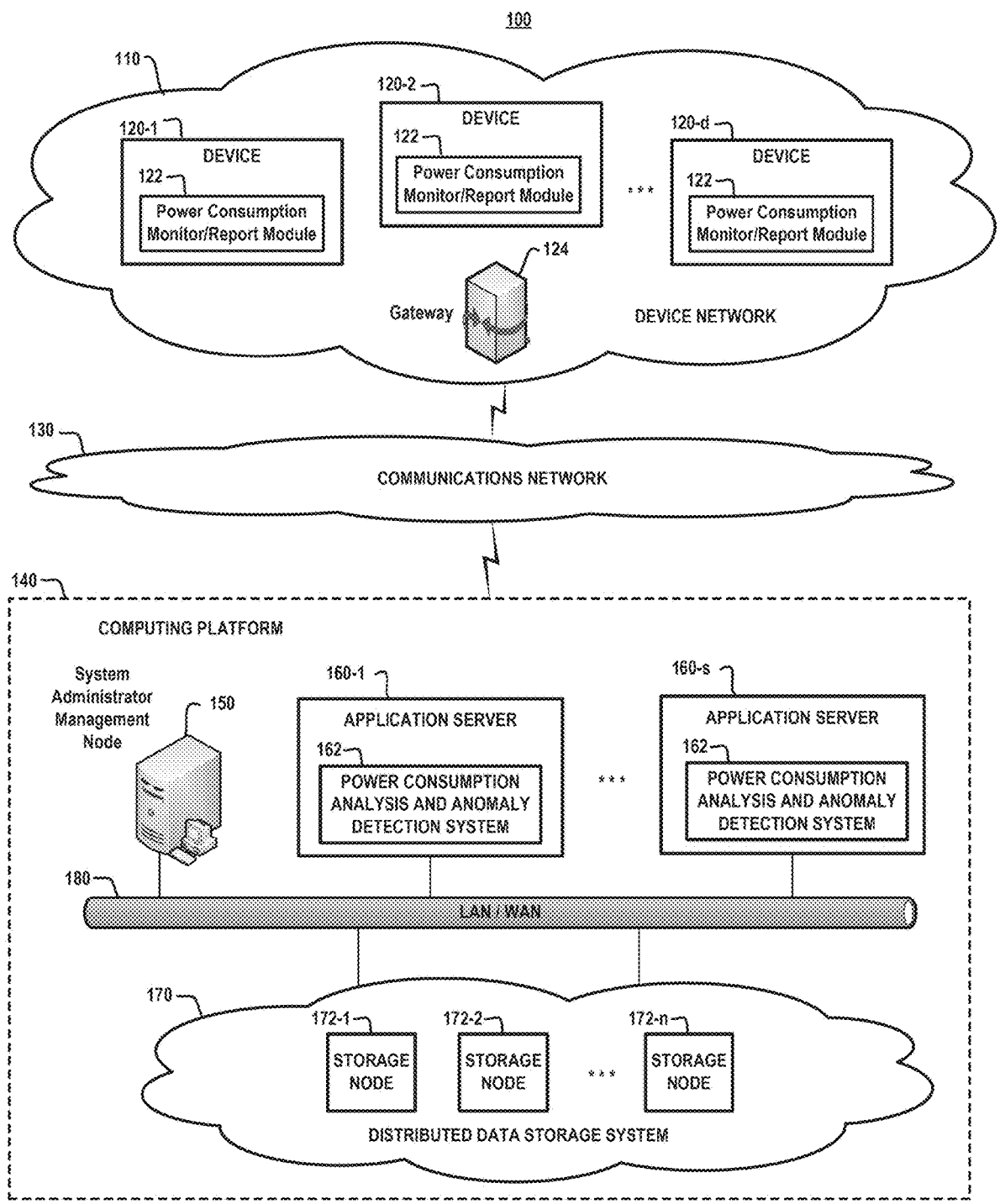
FIG. 1 is a high-level schematic illustration of a computing system which implements a system for detecting anomalous activity within a network environment based on power consumption of devices operating within the network environment, according to an exemplary embodiment of the disclosure.

FIG. 1 is a high-level schematic illustration of a computing system which implements a system for detecting anomalous activity within a network environment based on power consumption of devices operating within the network environment, according to an exemplary embodiment of the disclosure. The computing system 100 comprises a device network 110, a communications network 130, and a computing platform 140 which is coupled to the device network 110 via the communications network 130. The device network 110 comprises a plurality of devices 120-1, 120-2, . . . , 120-d (collectively referred to as devices 120 or IoT devices 120) and one or more gateways 124. Each device 120-1, 120-2, . . . , 120-d comprises a power consumption monitoring and reporting module 122, as well as other components as discussed below. The computing platform 140 comprises a system administrator management node 150 (or management node 150), a plurality of application server nodes 160-1, . . . , 160-s (collectively referred to as application server nodes 160), and a distributed data storage system 170. The application server nodes 160 implement a power consumption analysis and anomaly detection system 162. The distributed data storage system 170 comprises a plurality of storage nodes 172-1, 172-2, . . . , 172-n (collectively referred to as storage nodes 172) which are connected using any suitable storage fabric. The various system nodes 150, 160 and 170 communicate over a platform communications network 180 (e.g., a wide area network (WAN), a local area network (LAN), etc.).

In some embodiments, the device network 110 comprises an IoT device network wherein the IoT devices 120 operate within the device network 110. The IoT devices 120 comprise various types of devices, objects and things such as mobile computing devices, smart phones, RFID devices, smart sensors, smart appliances, wireless sensors, and other types of smart devices, objects and things that are configured to support IoT applications for one or more application domains. The IoT devices 120 generate data which is uploaded to the cloud computing platform 140 over the communications network 130 for data processing, data storage and data management by the cloud computing platform 140. In addition, the IoT devices 120 access and download data from the cloud computing platform 140 over the communications network 130. Moreover, depending on the types of devices and network configuration, some or all of the IoT devices 120 are configured for peer-to-peer communication with other IoT devices within the device network 110.

In some embodiments, the device network 110 comprises a sensor network (e.g., wireless sensor network) in which the devices 120 comprise wireless sensor nodes, as well as actuators, which are implemented for a given IoT application. In general, each sensor node comprises a power management module, a sensor, a microcontroller, and a transceiver (e.g., wireless transceiver). The power management module controls and manages power needed to operate the sensor node. In some embodiments, the power consumption monitoring and reporting module 122 is a component of the power management module of the sensor node. The sensor of a given sensor node is configured to transform captured signals (e.g., light, vibration, heat, chemical, etc.) into electrical signals that are processed by the microcontroller of the sensor node to generate sensor data. The transceiver of the sensor node transmits the sensor data to a target server node or device.

In some embodiments, the sensor nodes within a given monitored environment are configured to form a network through self-organization. In particular, each sensor node broadcasts status data to surrounding sensor nodes and receives status data from other sensor nodes, so that the sensor nodes can detect each other. The sensor nodes self-organize into a connected network according to a certain topology (linear, star, tree, mesh, etc.) for transmitting sensing data to other sensor nodes along a given path in the network by hopping. The sensor data from a given sensor node may be transmitted by multiple sensor nodes to reach the gateway node 124 after a multi-hop routing, wherein sensor data (and other data) is passed to the computing platform 140 via the communications network 130.

The communications network 130 may comprise, for example, a global computer network such as the Internet, a WAN, a LAN, a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 130 in some embodiments therefore comprises combinations of multiple different types of communications networks each comprising network devices configured to communicate using Internet Protocol (IP) or other related communication protocols. The communications network 130 comprises intermediate points (such as routers, switches, etc.) and other elements that form a network backbone to establish communication paths and enable communication between network endpoints.

In some embodiments, the computing system 100 of FIG. 1 comprises an IoT cloud computing system that is configured to support one or more application domains including, but not limited to, healthcare, home and building, retail, energy, manufacturing, transportation, logistics, and media application domains. The computing platform 140 manages and processes IoT data received from the various IoT devices 120 across one or more application domains. In some embodiments, the cloud computing platform 140 performs data processing, data storage, and data management functions to support one or more IoT network applications and/or other types of high performance computing (HPC) applications such as deep learning applications, machine learning, big data analytics, or other types of HPC applications that are typically implemented using a public cloud-based service system to deliver consumer or business applications and services to multiple end users, service providers, and/or organizations. In other embodiments, the cloud computing platform 140 comprises a private cloud platform that is accessible by a single organization, for example.

For cloud-based IoT computing, the application servers 160 are configured to host and manage one or more IoT applications, which are used by multiple, simultaneously connected users and/or entities in one or more application domains. Depending on the implementation of the cloud computing platform 140, the application servers 160 are configured to, e.g., execute business logic, execute scripts and services to query databases, and perform other computing functions that are needed to host and deliver IoT applications and services to multiple end users, service providers, and/or organizations. The application servers 160 and the constituent system components of the cloud computing platform 140 are implemented using (i) a cluster of servers that reside in a single facility (e.g., data center facility of private company) or (ii) a cluster of servers that reside in two or more data center facilities or remote locations (distributed over a cloud network) of a given service provider, for example.

In some embodiments, the IoT device network 110 comprises a network of sensor devices 120 which are configured to collect raw sensor data and transmit the collected sensor data to the cloud computing platform 140. The IoT device network 110 may comprises sensor devices that are utilized for, e.g., environmental monitoring (e.g., temperature, pressure, humidity, sound, etc.), process management monitoring, healthcare monitoring, industrial monitoring, traffic monitoring, etc. By way of example, for agriculture applications, sensor devices can be utilized for monitoring harvesting operations, crop growth, and detection of crop disease. In this regard, IoT sensor devices 120 can collect agricultural information in the form of text data or images of the crop field. For weather applications, a sensor network can be utilized to monitor weather conditions in a given area.

Furthermore, for the healthcare domain, the IoT 120 devices can be utilized for remote health monitoring and emergency notification. Health monitoring devices include blood pressure and heart rate sensors, blood oxygen content sensors, pacemakers, hearing aids, etc. Insurance companies can utilize IoT data to automatically track and reconcile insurance claims and ensure proper payments are made to claimants. Furthermore, for the home and building domain, the IoT devices 120 can be implemented to monitor and control mechanical, electrical and electronic systems that are utilized in residential, commercial or industrial buildings. For example, home and building automation systems can implement IoT devices/sensors to automatically control lighting, heating, ventilation, air conditioning, appliances, communication systems, entertainment and home security devices, etc.

Moreover, for the energy domain, the IoT devices 120 can include sensors and actuators that are implemented, for example, in energy consuming devices (e.g., switches, power outlets, light bulbs, etc.) and be equipped to communicate with power supply companies to provide IoT data that enables the power supply companies to effectively balance power generation and energy usage through "smart grids." For example, IoT devices would enable power supply companies to acquire and process IoT data with regard to energy usage in various regions and automatically control and manage production and distribution of electricity in such regions, e.g., control and manage distribution devices such as transformers. In addition, for the manufacturing domain, IoT devices can be used for network control and management of manufacturing equipment or manufacturing process control.

The computing platform network 180 is configured to enable communication between the management node 150 and the application servers 160, as well as to enable peer-to-peer network communication between various server nodes within the cloud computing platform 140. Depending on the network distribution and geographic location of the constituent components and nodes of the cloud computing platform 140, the computing platform network 180 may comprise, for example, a LAN, a WAN, or a combination of one or more LANs and WANs, as well as other types of communication networks that are commonly used to implement cloud computing systems.

The data storage system 170 can be implemented using any suitable data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. In some embodiments, the data storage nodes 172 comprise storage appliances with memory controllers, processors, cache memory, and non-volatile storage media to provide persistent storage resources for the application servers 160 and other computing nodes of the cloud computing platform 140. The data storage devices of the data storage nodes 172 may include one or more different types of persistent storage devices, or data storage arrays, such as hard disk drives (HDDs) or solid-state drives (SSDs), or other types and combinations of non-volatile memory.

In some embodiments, the data storage nodes 172 are implemented using, for example, an enterprise-class storage platform comprising high-performance, scalable storage arrays, which can be implemented for hyper-scale computing systems. For example, the data storage system 170 can be implemented using commercially available storage array systems of Dell EMC including, but not limited to, NSS, XtremIO, UNITY, VMAX, VNX, ScaleIO, etc. The storage nodes 172 of the distributed data storage system 170 are network-connected using a storage network fabric which can be implemented using any suitable networking system and protocol to enable shared access to the data storage system 170 by the various server nodes within the cloud computing platform 140. In some embodiments, the computing platform network 180 and the storage network fabric can be integrated into a converged framework such as a converged Ethernet framework using known techniques.

The power consumption analysis and anomaly detection systems 162 of the application server nodes 160 collectively implement a distributed power consumption analysis and anomaly detection system with distributed functionality across some or all of the application server nodes 160. The power consumption analysis and anomaly detection systems 162 are configured to detect anomalous activity of devices within the device network 110 based, at least in part on, the monitored power consumption/usage of the devices 120. The power consumption monitoring and reporting modules 122 of the devices 120 are configured to monitor and report power consumption data to the computing platform 140, wherein the power consumption data of a given device 120 comprises an indication of power usage by the given device 120 operating within the device network 110. The power consumption data that is collected by the power consumption monitoring and reporting modules 122 of the devices 120 is streamed to the computing platform 140 on a continual basis, or periodic basis.

The power consumption analysis and anomaly detection systems 162 of the application server nodes 160 are configured to collect large amounts of streamed power consumption data received from the devices 120 in the device network 110, and to index and store the received power consumption data for subsequent processing and analysis to detect for anomalous behaviors and activities within the device network 110 based on the streamed power consumption data. In other embodiments, the device network 110 comprises one or more nodes (e.g., the gateway node 124), which implement a network activity and communications monitoring system that is configured to collect and stream certain types of network-related information to the computing platform 140, wherein such network-related information is used in conjunction with the power consumption data to detect for anomalous behaviors and activities within the device network 110. For example, such network-related information includes, but is not limited to, monitored network activity in the device network 110, monitored communication patterns between different devices 120 in the device network 110, monitored behaviors of the devices 120 and other nodes in the device network 110, etc. In some embodiments, the gateway node 124 is configured to perform functions such as dynamic IoT device discovery and profiling using known techniques, e.g., by viewing all inbound and outbound network traffic, and identifying any device (e.g., specific make and model) that connects to the device network 110.

Exemplary system frameworks for the power consumption analysis and anomaly detection systems 162 of the application server nodes 160 will be discussed in further detail below with reference to FIG. 2. In addition, various methods according to exemplary embodiments of the disclosure which are implemented by the power consumption analysis and anomaly detection systems 162 for detecting anomalous activity and performing other functions will be described in further detail below with reference to FIGS. 2-8 for example.

In some embodiments, the management node 150 implements methods for registering the IoT devices 120 with the computing platform 140, wherein the registration process results in the assignment of unique device IDs to registered IoT devices 120. The unique device IDs are utilized to associate power consumption data and other relevant data (which is received and stored by the computing platform 140) to the devices 120. In addition, the management node 150 is configured to control operation of the registered IoT devices 120 within the device network 110. For example, when a given one of the power consumption analysis and anomaly detection systems 162 of the application server nodes 160 detects that a given IoT device 120 is exhibiting anomalous behavior, the management node 150 is alerted/notified of such anomalous behavior and then proceeds to at least temporarily block/prevent the given IoT device 120 from passing data to other IoT devices 120 within the device network 110 or otherwise prevent the given IoT device 120 from storing or accessing data from the backend distributed data storage system 170 of the computing platform 140, or perform other security related functions to ensure that the device network 110 and/or IoT devices 120 are not compromised by abnormal device behaviors or malicious attacks and to neutralize malicious activity.

Figure 2:
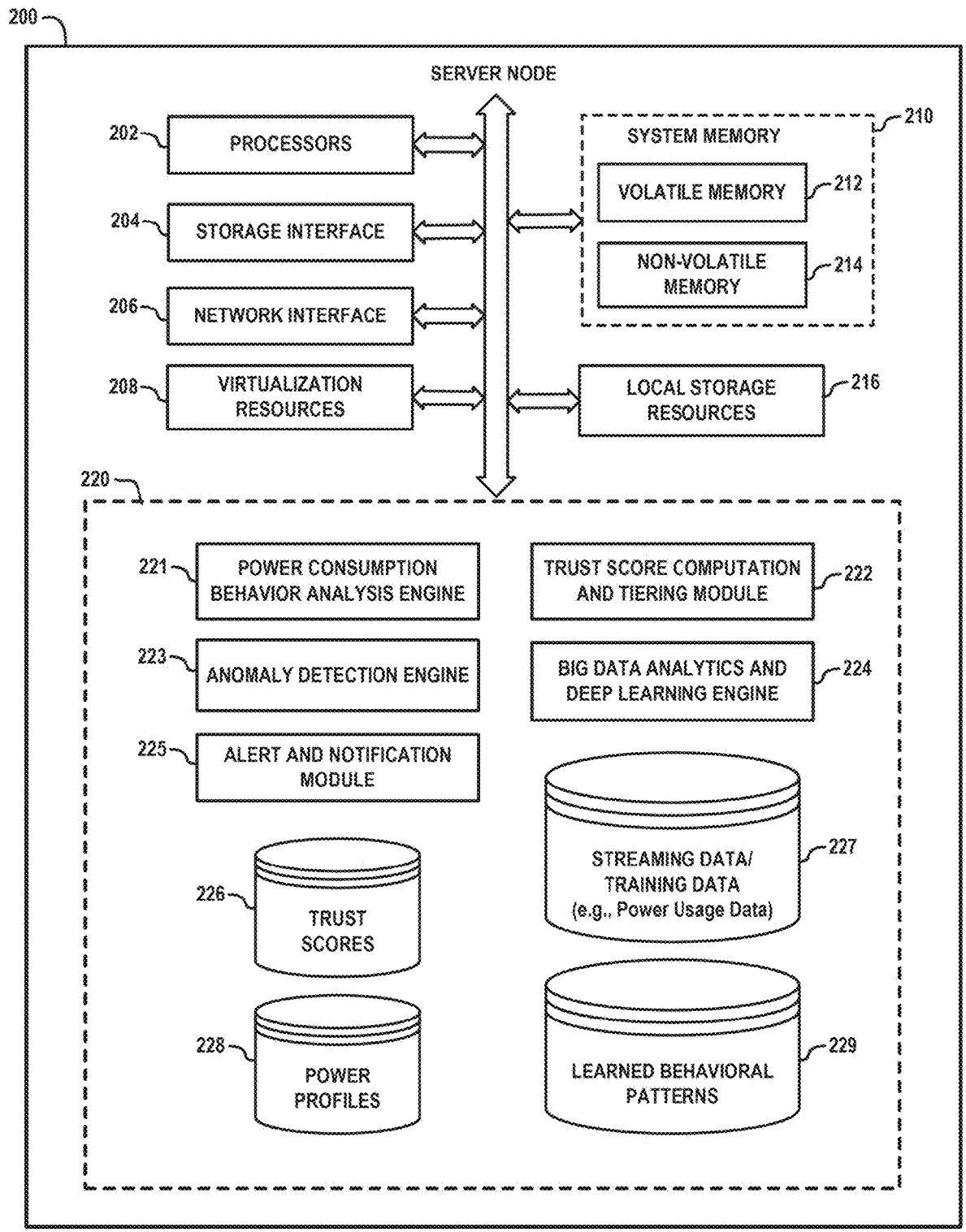
FIG. 2 schematically illustrates a server node which can be implemented in the computing system of FIG. 1, according to an exemplary embodiment of the disclosure.

FIG. 2 schematically illustrates a server node which can be implemented in the computing platform 140 of FIG. 1, according to an exemplary embodiment of the disclosure. More specifically, FIG. 2 illustrates a server node 200 which comprises processors 202, storage interface circuitry 204, network interface circuitry 206, virtual resources 208, system memory 210, and local storage resources 216. The system memory 210 comprises one or more of volatile memory 212 and non-volatile memory 214. In addition, the server node 200 comprises a power consumption analysis and anomaly detection system 220 which, in some embodiments, comprises a power consumption behavior analysis engine 221, a trust score computation and tiering module 222, an anomaly detection engine 223, a big data analytics and deep learning engine 224, an alert and notification module 225, and a plurality of information databases or datastores to maintain information such as trust scores 226, streaming data and training data 227, power profiles 228, and learned behavioral patterns 229. The hardware/software framework of the server node 200 illustrated in FIG. 2 can be implemented in one or more of the application servers 160 in FIG. 1.

The power consumption analysis and anomaly detection system 220 of FIG. 2 illustrates an exemplary embodiment for implementing the power consumption analysis and anomaly detection systems 162 in the application server nodes 160 of FIG. 1. In some embodiments, the system components 221, 222, 223, 224, and 225 comprise software modules or software programs that generate and/or utilize various types of information stored in the databases 226, 227, 228 and 229. Furthermore, in some embodiments, the functionality of the system components 221, 222, 223, 224 and 225 are distributed over multiple server nodes, wherein some or all of the system components 221, 222, 223, 224, and 225 execute on multiple server nodes to implement a distributed power consumption analysis and anomaly detection system. Moreover, in a distributed environment, the server nodes share the information stored in their local databases 226, 227, 228, and/or 229 to implement a distributed system.

The processors 202 comprise one or more types of hardware processors that are configured to process program instructions and data to execute a native operating system (OS) and applications that run on the server node 200. For example, the processors 202 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 204 enables the processors 202 to interface and communicate with the system memory 210, the storage resources 216, and other local storage and off-infrastructure storage media, using one or more standard communication and/or storage control protocols to read data from or write data to volatile and non-volatile memory/storage devices. Such protocols include, but are not limited to, NVMe, PCIe, Parallel ATA (PATA), Serial ATA (SATA), Serial Attached SCSI (SAS), Fibre Channel, etc. The network interface circuitry 206 enables the server node 200 to interface and communicate with a network and other system components. The network interface circuitry 206 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 208 can be instantiated to execute one or more applications or functions which are hosted by the server node 200. For example, the virtualization resources 208 can be configured to implement various modules and functionalities of a power consumption analysis and anomaly detection system discussed herein. In one embodiment, the virtualization resources 208 comprise virtual machines that are implemented using a hypervisor platform which executes on the server node 200, wherein one or more virtual machines can be instantiated to execute functions of the server node 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 200, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the disclosure is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 208 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 200 as well as various modules and functionalities of an intelligent data management system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the system modules 221, 222, 223, 224, and 225 of the power consumption analysis and anomaly detection system 220 comprise program code that is loaded into the system memory 210 (e.g., volatile memory 212), and executed by the processors 202 to perform respective functions as described herein. In this regard, the system memory 210 resources, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein excludes transitory, propagating signals.

The system memory 210 comprises various types of volatile random-access memory 212 and non-volatile random-access memory 214, or other memory, in any combination. The term "memory" or "system memory" as used herein refers to volatile and/or non-volatile memory which is utilized to store application program instructions that are read and processed by the processors 202 to execute a native operating system and one or more applications or processes hosted by the server node 200, and to temporarily store data that is utilized and/or generated by the native OS and application programs and processes running on the server node 200. The local storage resources 216 can include one or more HDDs, SSD storage devices, etc.

The power consumption analysis and anomaly detection system 220 receives and processes streaming data from the plurality of IoT devices 120 (e.g., sensors) within the device network 110 (e.g., sensor network), and stores the received streaming data in the database of streaming data and training data 227. For example, the streaming data comprises power consumption/usage data which is monitored and reported by each of the power consumption monitoring and reporting modules 122 that execute on the IoT devices 120. The streaming data may comprise other information such as network activity and communication patterns between the IoT devices 120 within the device network 110. The received streaming data is persistently stored in the database 227 and associated with respective IoT devices 120 (e.g., mapping the unique IDs of registered IoT devices 120 with the associated data). The stored streaming data is processed by one or more of the various modules 221, 222, 223 and 224 to identify normal and abnormal device behaviors within the device network 110 based on, e.g., an amount of power consumption and/or identified patterns of power usage and communication by and between the IoT devices 120.

For example, the power consumption behavior analysis engine 221 implements methods to process power consumption data that is received from the IoT devices 120 (and stored in the database 227) to determine if the power consumption/usage of a given IoT device is normal (i.e., expected) or abnormal (e.g., excessive) at a given time for a given application. In some embodiments, the power consumption behavior analysis engine 221 utilizes information in the database of power profiles 228 and/or the database of learned behavioral patterns 229 to analyze the streamed power consumption/usage data of the IoT devices 120 and detect for anomalies associated with, e.g., abnormal power consumption or other abnormal behaviors.

In particular, the power profile database 228 comprises a collection of "power profiles" for each type of IoT device 120 that is implemented in the device network 110. In some embodiments, the power profiles comprise vendor-created power profiles that provide information regarding normal ranges of power usage of various types of vendor-specific devices (e.g., wireless sensor devices) for different applications and/or configurations of the IoT devices. The vendor-created power profiles provide an initial baseline of power usage information which can be compared against the actual power consumption (e.g., average power over a period of time) of a given IoT device 120 within the device network 110 to determine if the given IoT device 120 is consuming a normal or abnormal amount of power for a given application and/or configuration.

In addition, in some embodiments, the power consumption analysis and anomaly detection system 220 is configured to update the vendor-specific power profiles over time by building or otherwise learning power consumption behavior profiles for the IoT devices 120 within the device network 110 based on historical power consumption/usage information that is reported by the IoT devices 120 for different use scenarios. The power consumption behavior profiles can be stored in the database of learned behavioral patterns 229 and utilized for anomaly detection, or otherwise stored in the database of power profiles 228 as updated power profiles that are used for anomaly detection.

The trust score computation and tiering module 222 implements methods for analyzing various types of information such as power consumption/usage of IoT devices, communication patterns between IoT devices, etc., to thereby generate trust scores for the IoT devices. The trust score for a given IoT device provides a measure or indication of how trustworthy the device is with regard to exhibiting normal operational behavior. The trust scores of IoT devices 120 are dynamic scores that are continuously or periodically computed over time, wherein the trust levels of IoT devices can increase or decrease over time based on the monitored behaviors of the IoT devices. The trust scores can be determined using various methods. For example, default trust scores (e.g., low trust scores) can be assigned to newly configured and provisioned devices before baseline behaviors can be established for such devices operating within a given network environment. These default trust scores can be based, for example, on the type of IoT device. For example, IoT devices which have relatively high processing power and can be maliciously operated to cause significant harm in a network environment may be accorded a lower default trust score, as compared to a simple sensor device that is only capable of generating sensor readings that can be read by other devices. The default trust scores can increase over time as the given IoT device is determined to operate normally and non-maliciously within the given network environment over time.

In other embodiments, trust scores for IoT devices are computed using formulas that are based on a weighted combination of different factors related to, e.g., the types of IoT devices, the configurations of IoT devices, the behaviors of the IoT devices (e.g., power consumption behavior, communication patterns, etc.). For example, in some embodiments, the trust score computation and tiering module 222 utilizes information included within processing results of one or more of the modules 221, 223, and 224 to compute trust scores for IoT devices. The trust scores can be computed based on mathematical or statistical models which take into account such different factors. For example, the degree to which the power consumption of a given IoT device increases over a baseline amount (without a change in configuration or use of the IoT devices) can be a factor that determines the amount by which the trust score of the IoT device decreases. Indeed, a drastic increase in power consumption is an indicator that the IoT device is possibly operating in an abnormal or malicious manner. In addition, different types of abnormal or unexpected behaviors may pose different risks to a network ecosystem. As such, trust score formulas or models can be configured to accord higher weights to behaviors of IoT devices that pose higher risks of harm to a network ecosystem (which causes a more dramatic decrease in the trust scores of the IoT devices), as compared to certain behaviors of IoT devices that may pose relatively lower risks of harm to the network ecosystem.

In addition, the trust score computation and tiering module 222 implements methods for assigning a given IoT device into one of a plurality of trust tiers based on the current trust score of the given IoT device. For example, in some embodiments, the trust score computation and tiering module 222 may define three trust tiers—(i) normal, (ii) suspicious, and (iii) abnormal, wherein each trust tier is assigned a predefined range of trust scores. In this example, the behavior of a given IoT device would be classified as normal, suspicious or abnormal depending on which range of trust tier scores includes the current trust score of the given IoT. Depending on the implementation and degree of granularity in trust tier levels, etc., trust score can range from, e.g., 1-10, 1-100, 1-500, 1-1000, etc. As explained in further detail below, in some embodiments, the different trust tiers correspond to different levels of authentication that are to be utilized to authenticate the IoT devices operating within the given network environment.

The anomaly detection engine 223 implements methods to process streaming data (e.g., network activity data, power consumption data, etc.) received from the IoT devices 120 and the device network 110 to detect for possible anomalous activity related to security breaches (intrusion detection) such as sniffer attacks, denial-of-service attacks, man-in-the-middle attacks, etc., using behavioral patterns that are stored in the database of learned behavioral patterns 229. In some embodiments, the anomaly detection engine 223 implements intrusion detection methods in which the reported power consumption/usage of IoT devices is one of a plurality of metrics that are used to detect anomalous network activity and behaviors based on the behavioral patterns stored in the learned behavioral patterns database 229.

For example, a sniffer attack refers to a process that is used by attackers (e.g., hackers, malware, etc.) to capture network traffic using a sniffer application, wherein the sniffer application can capture network packets and access/analyze data within the network packets for unauthorized purposes (e.g., capture sensitive network information, such as passwords, account information etc.). A denial-of-service (DoS) attack refers to a process that is used by attackers to render a given device or network resource unavailable for its intended use. For example, a DoS attack may cause an IoT device to send an excessive amount of false packets (referred to as flooding) into the network, or fully consume resources of a device to starve the device of resources for its normal operation, etc. A man-in-the-middle attack refers to a process that is used by an attacker to intercept all relevant messages passing between two devices and inject new messages, which gives the attacker the ability to capture and manipulate sensitive information in real-time.

In typical IoT applications that implement a network of wireless sensor devices, for example, the wireless sensors are constrained in power, memory, and processing power. As such, various types of attacks such as outlined above can result in significant, abnormal power consumption of the wireless sensor devices. In this regard, the power consumption/usage behavior of one or more of the devices can be used to generate signatures or behavior patterns that are maintained in the learned behavioral patterns database 229.

In some embodiments, the learned behavioral patterns database 229 comprises "normal behavior profiles" which comprise signatures or patterns of normal network activities and/or normal device behavior. In such instances, the anomaly detection engine 223 is configured to compare the normal behavior profiles with a current set of streaming data in database 227 to detect certain network activities and device behaviors as being "abnormal" when such network activities and device behaviors deviate from one or more normal behavior profiles by statistically significant amounts.

In other embodiments, the learned behavioral patterns database 229 comprises "abnormal behavior profiles" which comprise signatures or patterns of known abnormal network activities and/or abnormal device behavior. In such instances, the anomaly detection engine 223 is configured to compare the abnormal behavior profiles with a current set of streaming data in the database of streaming data 227 to detect certain network activities and device behaviors that are known to be abnormal when such network activities and device behaviors are determined to positively correspond to one or more abnormal behavior profiles within a predefined statistical range. In another embodiment, the database of learned behavioral patterns 229 comprises both normal and abnormal behavior profiles, which are used for anomaly detection.

The big data analytics and deep learning engine 224 implements methods to process a large amount of streaming data and/or training data that is stored in the database of streaming data/training data 227 to generate learned behavior patterns that are stored in the learned behavioral patterns database 229. Big data analytic methods are implemented to mine a massive amount of streaming data that is collected over time (e.g., power consumption data, network activity data, etc.) and extract meaningful behavioral patterns for devices (e.g., sensor nodes) operating in a device network based on the streaming data collected over time. Deep learning methods are implemented to extract high-level, complex abstractions as data representations through a hierarchical learning process. Complex abstractions are learned at a given level based on relatively fewer complex abstractions formulated in a preceding level in the hierarchy. The deep learning methods are used to analyze and learn patterns from massive amounts of raw streaming data that is stored in the database 227 which is primarily unlabeled and un-categorized.

In view of the above, it is to be appreciated that the various data processing engines and modules 221, 223, and 224 can be implemented to detect for various types of anomalous network behaviors, activities, and/or intrusions based on power consumption data alone, or based on power consumption data in conjunction with other types of data/metrics such as patterns of network communications and other behaviors of devices operating within a device network. As noted above, the data generated by the data processing engines and modules 221, 223, and 224 are utilized by the trust score computation and tiering module 222 to dynamically and continuously compute trust scores for IoT devices and assign the IoT devices to target trust tiers based on the trust scores. The alert and notification module 225 implements methods for logging a description of potential anomalous activity and/or trust level (e.g., trust score or assigned trust tier) which is detected/according by any one of the data processing engines and modules 221, 222, 223, and 224, and sending alerts and notification to a management node (e.g., the system administrator management node 150, FIG. 1) for further analysis and review.

Figure 3:
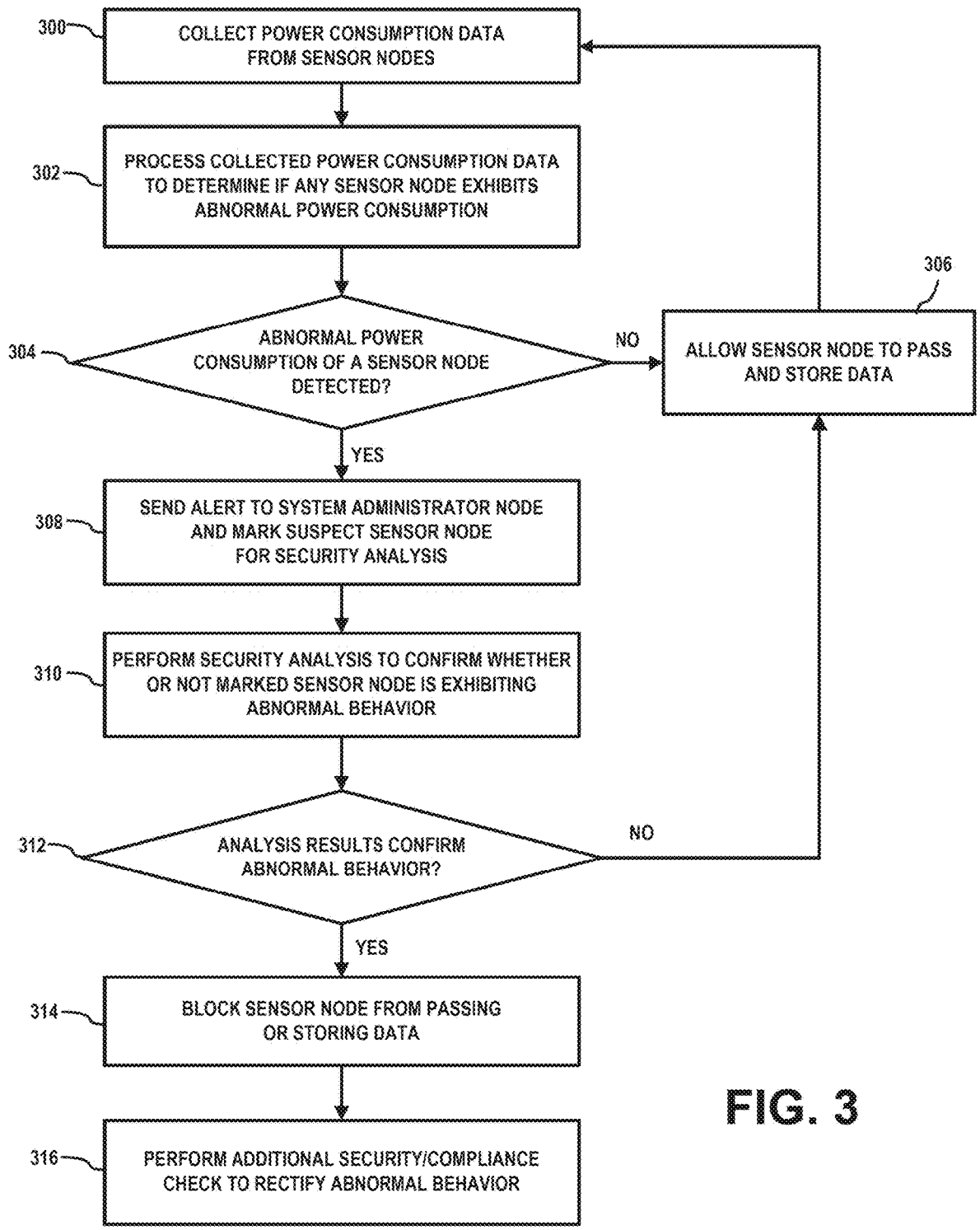
FIG. 3 is a flow diagram of a method for detecting anomalous activity within a network environment based on power consumption of devices operating within the network environment, according to an exemplary embodiment of the disclosure.

FIG. 3 is a flow diagram of a method for detecting anomalous activity within a network environment based on power consumption of devices operating within the network environment, according to an exemplary embodiment of the disclosure. In particular, FIG. 3 illustrates an exemplary mode of operation of the power consumption analysis and anomaly detection system 220 for detecting anomalous activity within a network of sensor nodes based on reported power consumption/usage of the sensor nodes operating within the network, according to an exemplary embodiment of the disclosure. The power consumption analysis and anomaly detection system 220 collects power consumption data that is received from sensor nodes within the sensor network (block 300). The power consumption data comprises an indication of power usage reported by the sensor nodes operating within the sensor network. The streaming power consumption data is stored in the streaming data database 227 using suitable indexing techniques to associate power consumption data with corresponding sensor nodes that report the power consumption data to the power consumption analysis and anomaly detection system 220.

The collected power consumption data is processed to determine if any sensor node is exhibiting abnormal power consumption (block 302). In one embodiment, this process can be implemented by the power consumption behavior analysis engine 221 processing the collected power consumption data against learned behavioral patterns of power consumption of the sensor nodes, which are stored in the learned behavioral patterns database 229, or otherwise using baseline or updated power profiles of the sensor nodes, which are stored in the power profiles database 228.

A determination is made as to whether any of the sensor nodes currently operating within the sensor network are detected as exhibiting abnormal power consumptions (block 304). If a given sensor node is not detected as exhibiting abnormal power consumption (negative determination in block 304), the sensor node is allowed to continue passing data within the sensor network and storing data in the backend distributed data storage system 170 of the computing platform 140 (block 306). On the other hand, when a given sensor node is detected as exhibiting abnormal power consumption (affirmative determination in block 304), the alert and notification module 225 sends an alert to the management node 150 of the computing platform 140 and the given node is marked as "suspect" for a security analysis (block 308).

A security analysis is then performed to confirm whether or not the marked sensor node is actually exhibiting abnormal behavior (block 310). This security analysis can be performed manually by a system administrator, or performed automatically (or semi-automatically) using other anomaly detection methods and/or manual review methods to verify the results of the initial detection. If the results of the security analysis confirm that the given sensor node is not exhibiting abnormal behavior (negative determination in block 312), the sensor node is allowed to continue passing data within the sensor network and storing data in the backend distributed data storage system 170 of the computing platform 140 (block 306). On the other hand, if the results of the security analysis confirm that the given sensor node is actually exhibiting abnormal behavior (affirmative determination in block 312), the sensor node is prevented/blocked from passing data within the sensor network or storing data in the backend distributed data storage system 170 of the computing platform 140 (block 314). An additional security check or compliance check can then be performed to rectify the detected abnormal behavior of the sensor node (block 316).

Figure 4:
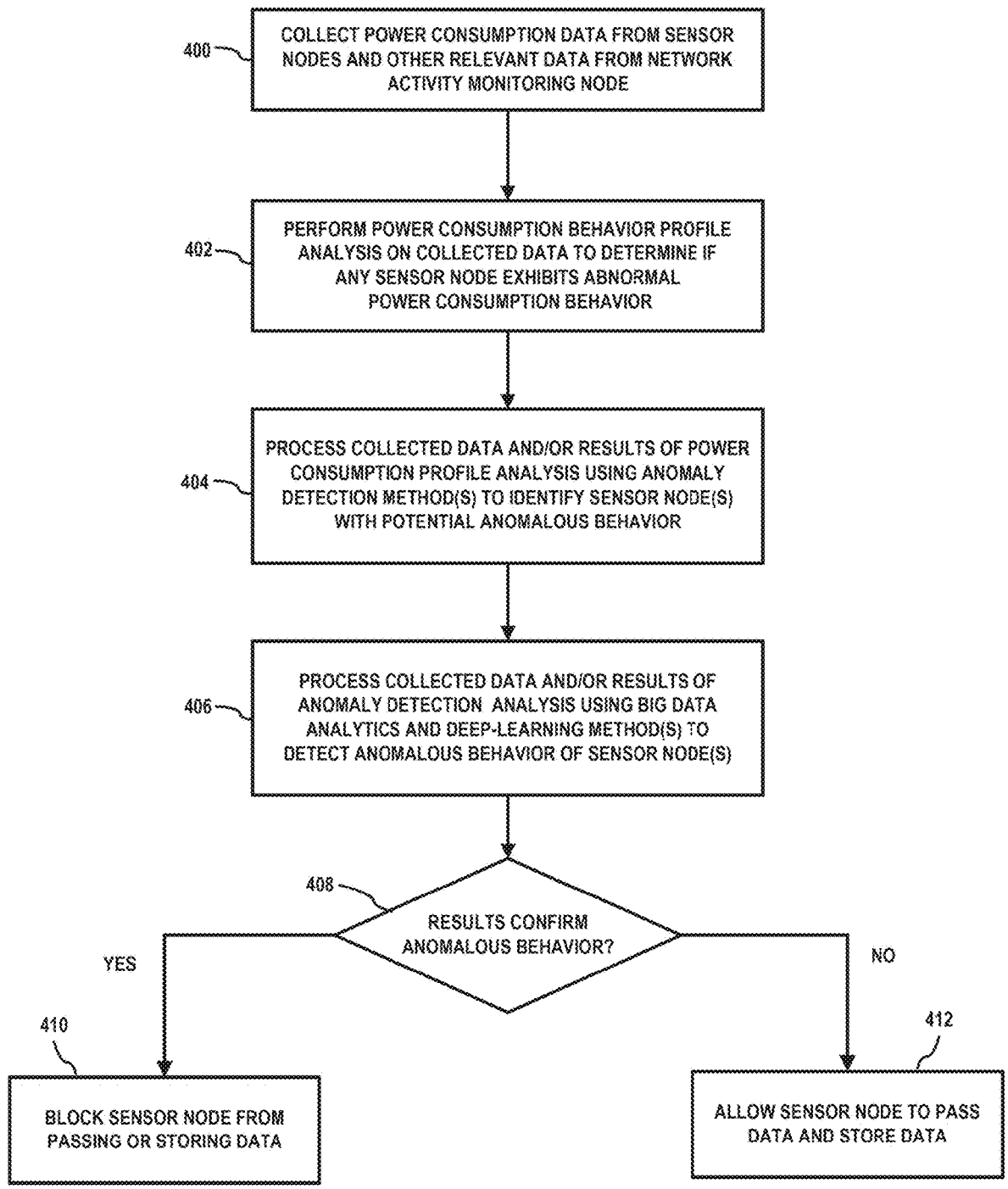
FIG. 4 is a flow diagram of a method for detecting anomalous activity within a network environment based on power consumption of devices operating within the network environment, according to another exemplary embodiment of the disclosure.

FIG. 4 is a flow diagram of a method for detecting anomalous activity within a network environment based on power consumption/usage of devices operating within the network environment, according to another exemplary embodiment of the disclosure. In particular, FIG. 4 illustrates an exemplary mode of operation of the power consumption analysis and anomaly detection system 220 for detecting anomalous activity within a sensor network based on reported power consumption/usage data from sensor nodes operating within the sensor network and/or other types of network-related information that is streamed from the sensor network with regard to, e.g., sensor network activities, communication patterns between different sensor nodes, behaviors of sensor nodes, etc., according to an exemplary embodiment of the disclosure. The power consumption analysis and anomaly detection system 220 collects power consumption data that is streamed from sensor nodes within the sensor network, as well as any other relevant data indicative of network activity, communication patterns between different sensor nodes, and other behaviors of the sensor nodes, etc., which is streamed from a network activity monitoring node in sensor network (block 400). The streaming data received from the sensor network is stored in the streaming data database 227.

As a first level of analysis, a power consumption behavior profile analysis can be performed on the collected power consumption data to determine if any sensor node exhibits abnormal power consumption behavior (block 402). In some embodiments, this process can be implemented by the power consumption behavior analysis engine 221 processing the collected power consumption data against learned behavioral patterns of power consumption of the sensor nodes, which are stored in the learned behavioral patterns database 229, or otherwise using baseline or updated power profiles of the sensor nodes, which are stored in the power profile database 228.

As a second level of analysis, an anomaly detection process can be performed to process the collected streaming data and/or the results of the power consumption behavior profile analysis to identify sensor nodes that are exhibiting potential anomalous behavior (block 404). In some embodiments, this process can be implemented by the anomaly detection engine 223 processing the collected data against the learned behavioral patterns of the sensor nodes, which are stored in the learned behavioral patterns database 229, to detect for possible anomalous behaviors of one or more sensor nodes based on reported power consumption data in conjunction with other relevant data with regard to network activity, communication patterns between different sensor nodes, and other behaviors of the sensor nodes, etc.

As a third level of analysis, a big data and deep learning analysis can be performed to process the collected streaming data and/or the results of the anomaly detection process to identify sensor nodes that are exhibiting anomalous behavior (block 406). In some embodiments, this process can be implemented by the big data analytics and deep learning engine 224 processing the collected data against learned behavioral patterns of the sensor nodes, which are stored in the learned behavioral patterns database 229.

In some embodiments, the processing results from each of the different levels of anomaly detection (blocks 402, 404 and 406) are collectively processed to make a final determination as to whether one or more sensor nodes are exhibiting anomalous behavior (block 408). When a given sensor node is determined to be exhibiting anomalous behavior (affirmative determination in block 408), the given sensor node is blocked from passing data in the sensor network or storing data to the backend data storage system (block 410). On the other hand, if a given sensor node is not identified as exhibiting anomalous behavior (negative determination in block 408), the given sensor node is allowed to continue passing data in the sensor network and storing data to the backend data storage system (block 412).

Figure 5:
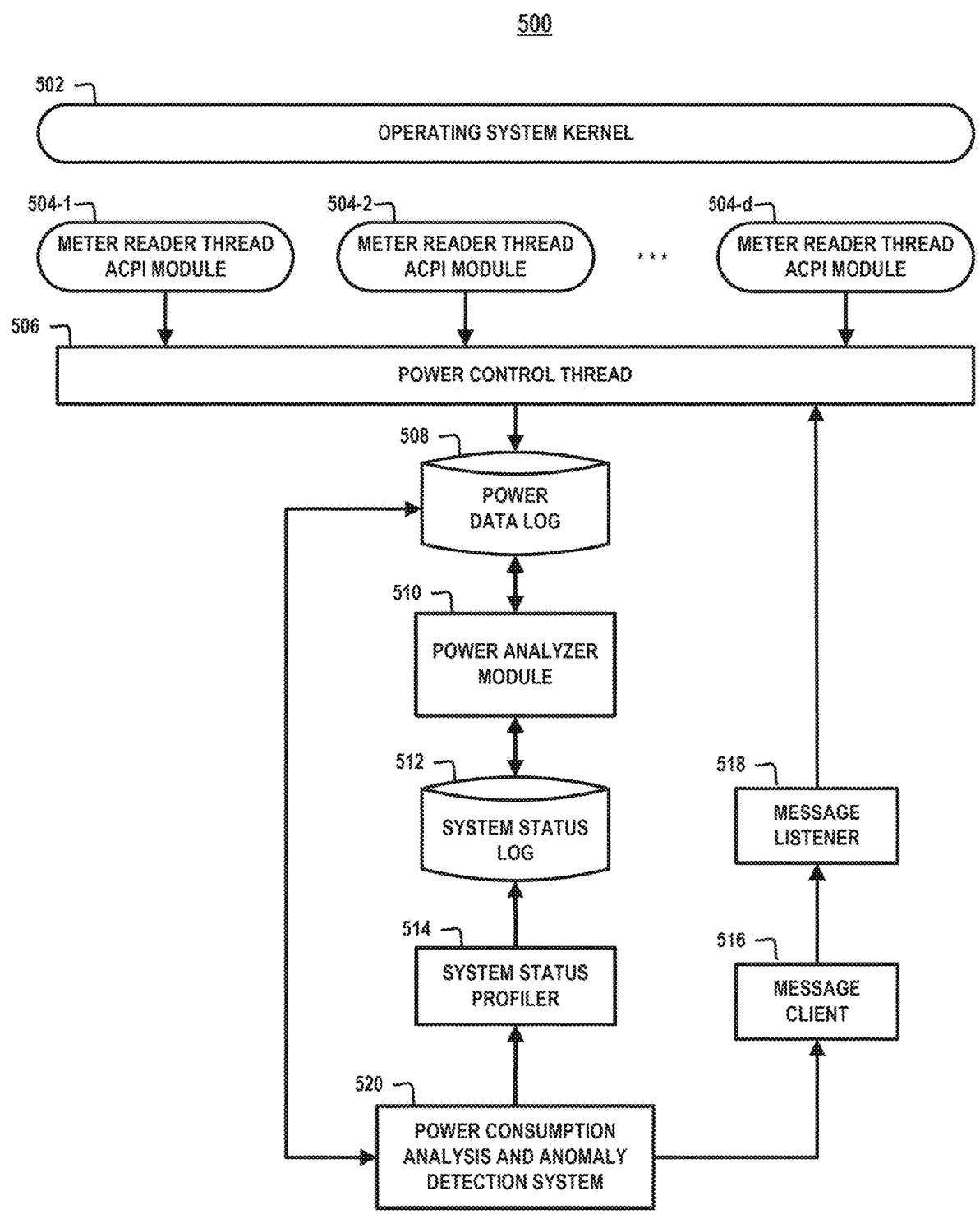
FIG. 5 schematically illustrates a system for integrating a power consumption analysis and anomaly detection system with an advanced configuration and power interface system to enable automated power profiling of devices operating within a network environment, according to an exemplary embodiment of the disclosure.

FIG. 5 schematically illustrates a system for integrating a power consumption analysis and anomaly detection system with an advanced configuration and power interface (ACPI) system to enable automated power profiling of devices operating within a network environment, according to an exemplary embodiment of the disclosure. In particular, FIG. 5 depicts a system 500 to enable a power consumption analysis and anomaly detection system to perform various functions including, but not limited to, (i) interact with an ACPI system to access power consumption data of IoT devices operating within a network environment, (ii) obtain system power profiles of the IoT devices within the network environment and correlate the system power profiles with historical profiles, and (iii) control power to the IoT devices (e.g., shutting down IoT devices that are identifies as exhibiting abnormal behaviors). As is known in the art, ACPI is a power management specification that allows an operating system to control the amount of power given to devices connected to a computer (e.g., the operating system can turn off peripheral devices when not in use).

Referring to FIG. 5, the system 500 comprises an operating system kernel 502, a plurality of meter reader threads 504-1, 504-2, . . . , **504-*d*, a power control thread 506, a power data log 508, a power analyzer module 510, a system status log 512, a system status profiler 514, a message client 516, a message listener 518, and a power consumption analysis and anomaly detection system 520. The system 500** comprises a software platform that executes one or more server nodes in an IoT ecosystem, which are responsible for collecting power usage information from IoT devices operating within a device network.

In particular, the operating system kernel 502 implements kernel functions configured to support memory management, process and task management, disk management, etc. The operating system kernel 502 connects the monitored hardware (e.g., IoT devices) to the software platform of the system 500. The meter reader threads 504-1, 504-2, . . . , 504-d collect power readings from IoT devices and send the readings to the power control thread 506. In some embodiments, there is at least one meter reader thread instantiated for each IoT device within a given network environment. In some embodiments, the IoT devices implement power meters and/or ACPI-enabled power supplies to support direct power measurements. The power control thread 506 provides a central control module to collect power readings from IoT devices and control power consumption of IoT devices operating within a given network in response to, e.g., control messages from the power consumption analysis and anomaly detection system 520.

The power control thread 506 performs data logging functions to store power readings that are collected over time in the power data log 508 (e.g., a centralized storage location for power readings). The power analyzer module 510 implements functions for analyzing or otherwise processing the logged power readings stored in the power data log 508 to determine power consumption information for IoT devices within the network environment. For example, the power analyzer module 510 can implement methods from converting DC current to power, performing data sampling point interpolation, statistical calculation, etc., with regard to power consumption of IoT devices. The system status profiler 514 implements methods for generating system status profiles of the given network environment based on information provided by the power consumption analysis and anomaly detection system 520 and storing the system status profile information in the system status log 512. The information in the power data log 508 and the system status log 512 are used by the power analyzer module 510 to determine power consumption profiles of IoT devices operating within the given network environment.

The message client 516 comprises a broker that is responsive to requests (e.g., library calls) from the power consumption analysis and anomaly detection system 520 to transmit and receive message to and from the power control thread 506. The message listener 518 comprises an object that serves as an asynchronous event handler for messages. To support an automated profiling process and correlating current power consumption profiles of IoT devices operating within an given network (generated by the system 500) with historical power profiles of the IoT devices (e.g., database of power profiles 228, FIG. 2) maintained by the power consumption analysis and anomaly detection system 520, the software system 500 implements a suitable application programming interface (API) and library functions to allow the power consumption analysis and anomaly detection system 520 to issue messages through library calls to request the power control thread to take appropriate actions to annotate power profiles, as well as control power usage of the IoT devices.

Figure 6:
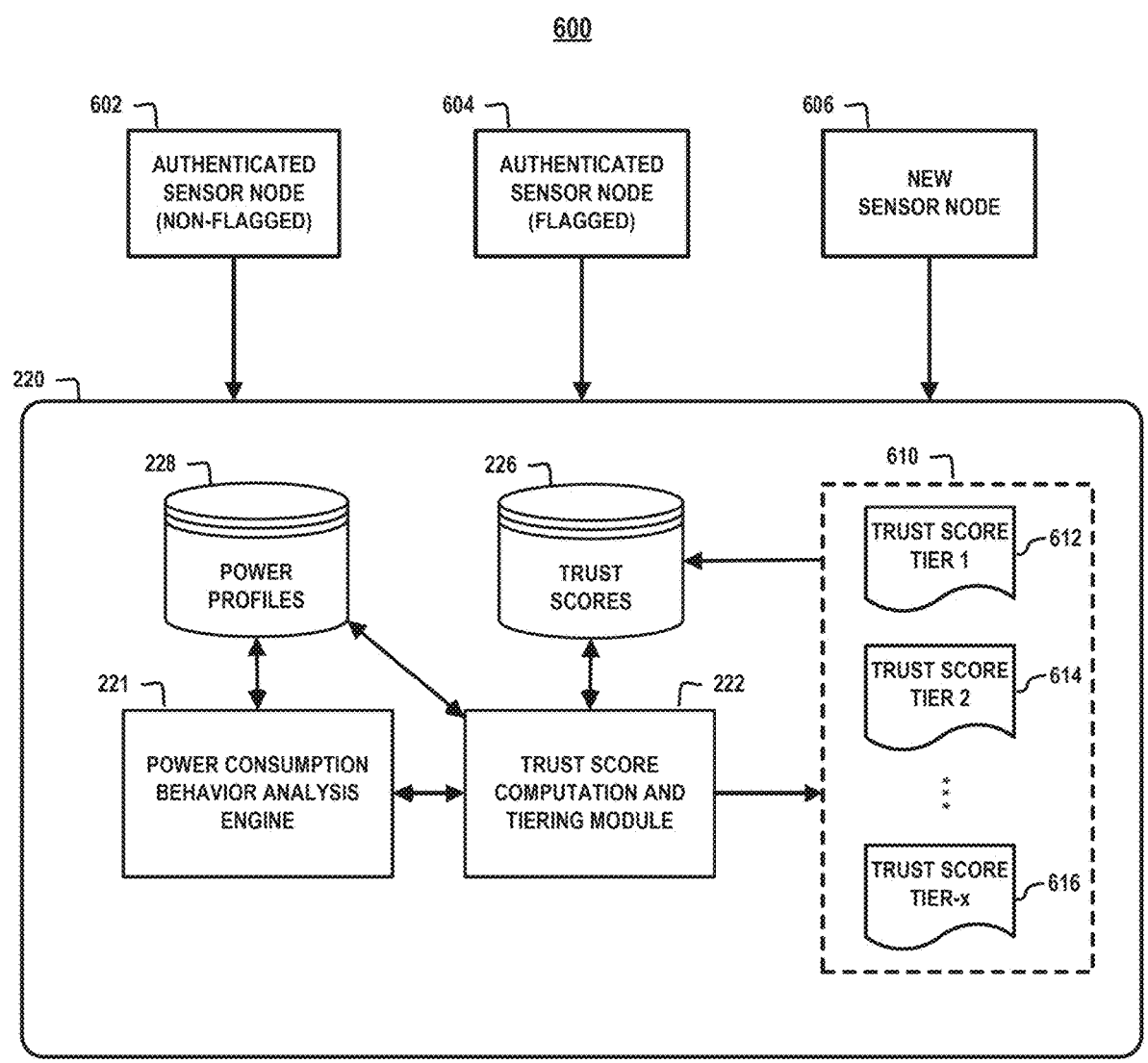
FIG. 6 schematically illustrates a system for generating trust scores for devices operating within a network environment and assigning the devices into trust tiers based on the trust scores, according to an exemplary embodiment of the disclosure.

FIG. 6 schematically illustrates a system 600 for generating trust scores for devices operating within a network environment and assigning the devices into trust tiers based on the trust scores, according to an exemplary embodiment of the disclosure. In particular, FIG. 6 illustrates an exemplary embodiment in which trust scores are generated for IoT devices within a given network environment based on power consumption profiles of the IoT devices. FIG. 6 illustrates various components of the power consumption analysis and anomaly detection system 220 (FIG. 2) which may be utilized to generate trust scores for IoT devices including, for example, the power consumption behavior analysis engine 221, the trust score computation and tiering module 222, the database of power profiles 228 and the database of trust scores 226. As noted above, the power consumption behavior analysis engine 221 implements methods to process power consumption data that is received from IoT devices (e.g., sensor nodes) operating within a given network environment to determine if the power consumption/usage of a given IoT device is normal (i.e., expected) or abnormal (e.g., excessive) at a given time for a given application.

In some embodiments, the power consumption behavior analysis engine 221 utilizes information in the database of power profiles 228 to analyze the streamed power consumption/usage data of the IoT devices and detect for anomalies associated with, e.g., abnormal power consumption or other abnormal behaviors. The trust scores 226 can be utilized to identify anomalous or abnormal behaviors of a given IoT device based on the total power consumption of the given IoT device. For example, a current trust score for a given IoT device can be compared to one or more previously computed trust scores for the given IoT device to determine if the current trust score is less than, or inconsistent with, one or more previously computed trust scores. In the event that excessive power consumption is determined for a given IoT devices based on a currently computed trust score, a verification process can be performed to determine if there has been a change in the network configuration, network topology, or device configuration of the IoT device that would justify the increased power consumption.

FIG. 6 further illustrates a process in which trust scores are determined, in part, based on the authentication status of IoT devices. For example, FIG. 6 illustrates various sensor nodes 602, 604, and 606 which operate within a given network environment that is monitored by the power consumption analysis and anomaly detection system 220. The sensor node 602 comprises an authenticated sensor node that is not flagged as being a possible security threat to network security or possibly operating in an abnormal manner. The sensor node 604 comprises an authenticated sensor node that is flagged as being a possible threat to network security or operating in a possible abnormal manner. The sensor node 606 comprises a newly added sensor node that requires a first time authentication. In this instance, the trust scores for the given IoT devices 602, 604 and 606 can be adjusted or otherwise computed based their status (e.g., non-flagged, flagged, newly added, etc.). For example, while a newly added sensor node may be operating normally with regard to power consumption parameters specified by a pre-defined device power profile, the trust score for the newly added sensor node can be initially assigned to a lower score commensurate with the newly added sensor node requiring proper authentication.

FIG. 6 further illustrates trust score tiers 610 comprising a plurality of predefined trust score tiers (e.g., Tier 1, Tier 2, . . . , Tier-x). In some embodiments, the trust score tiers 610 comprise a trust score tier 612 which comprises trust scores of IoT devices that are deemed to have a highest level of trust, a trust score tier 614 which comprises trust scores of IoT devices that are deemed to have medium level of trust, and a trust score tier 616 which comprises trust scores of IoT devices that are deemed to have the lowest level of trust. In this regard, the IoT devices operating within a given network environment can be clustered into the specified trust tiers 610 based on current trust scores accorded to the IoT devices. For example, assuming that there are three trust tiers (normal, suspicious, abnormal) and that trust scores can range from 1-100. The low trust tier (e.g., abnormal) can be assigned to a range of trust scores from 1-33, the middle trust tier (e.g., suspicious) can be assigned to a range of trust scores from 34-66, and the high trust tier (e.g., normal) can be assigned to a range of trust scores from 67-100. Other levels of trust tier granularity can be applied. For example, there can be four trust tiers, e.g., white, green, orange, and red trust tiers, wherein a "white" trust tier denotes a highest level of trust accorded to a given IoT device, a "green" trust tier denotes a sufficient level of trust accorded to a given IoT device, an "orange" trust tier denotes a level of suspicion accorded to a given IoT device, and a "red" trust tier denotes a level of risk accorded to a given IoT device based abnormal behavior or malicious activities of the IoT device.

In some embodiments, the different trust tiers 610 specify different authentication procedures (with different authentication levels) that are selected by, e.g., the gateway 124 (FIG. 1) to authenticate IoT devices within the device network 110. For example, an IoT device with a high trust score (and thus assigned to a high level trust tier) can require a low level of authentication when operating within the network, whereas an IoT device with a low trust score (and assigned to a low level trust tier) can require a high level of authentication when operating within the network. In other words, in some embodiments, each trust tier specifies an authentication level for devices assigned to the trust tier, one or more authentication procedures are applied to authenticate a given IoT device operating within the network based on the authentication level specified by the trust tier to which the given IoT device is assigned.

By way of example, assume an IoT device comprises a mobile phone and there are three trust tiers—normal, suspicious, and abnormal. If the mobile phone is currently deemed to have a high level of trust and is included within a high trust tier (e.g. normal trust tier), a low level of authentication may be required to authenticate the mobile device such as a (i) user name and (ii) password, or a security certificate. If the mobile phone is currently deemed to have a mid-level of trust (e.g., suspicious trust tier), a high level of authentication may be required to authenticate the mobile device such as a (i) user name, (ii) password, and (iii) fingerprint, or using an Advanced Encryption Standard (AES) 256-bit password encryption. Furthermore, if the mobile device is deemed to have a low level of trust (e.g., abnormal trust tier), an even higher level of authentication may be required to authentication the mobile device using a multi-factor authentication scheme based on) (i) user name, (ii) password, (iii) fingerprint, and (iv) AES 256-bit password encryption. The types of authentication levels and protocols that are applied for the given different trust tiers can vary for different types of IoT devices within the same trust tier.

Figure 7:
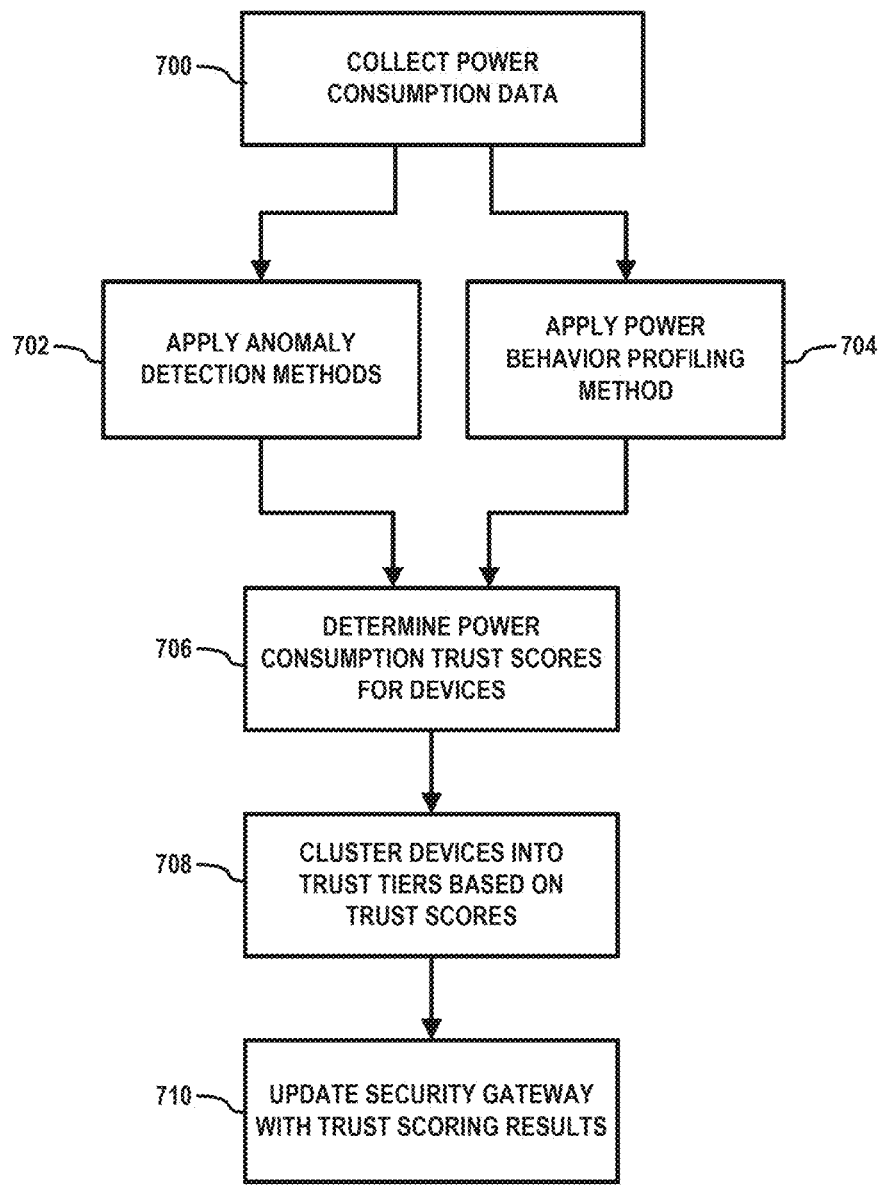
FIG. 7 is a flow diagram of a method for determining trust scores for devices operating within a network environment, according to an exemplary embodiment of the disclosure.

FIG. 7 is a flow diagram of a method for determining trust scores for devices operating within a network environment, according to an exemplary embodiment of the disclosure. In particular, FIG. 7 illustrates a method for determining trust scores of IoT devices (e.g., sensor devices) within an IoT network environment, according to an exemplary embodiment of the disclosure. The process comprises tracking and collecting power consumption data from the IoT devices operating within the IoT network environment (block 700). The collected power consumption data is processed by the anomaly detection engine 223 (FIG. 2) to detect for possible anomalous activity of IoT devices using, for example, behavioral patterns for the IoT devices, which are stored in the database of learned behavioral patterns 229 (block 702). In addition, the collected power consumption data is analyzed using power consumption behavior profiling methods (e.g., the power consumption behavior analysis engine 221, the system 500 of FIG. 5, etc.) to determine power consumption profiles of the IoT devices (block 704).

The processing results in block 702 or block 704, or the processing results in both blocks 702 and 704, are utilized to compute power consumption trust scores for the IoT devices operating within the IoT network environment (block 706). As noted above, the trust scores for the IoT devices dynamic scores that are continuously or periodically computed over time, wherein the trust levels of IoT devices can increase or decrease over time based on the monitored behaviors of the IoT devices. In addition, as noted above, the trust scores (in block 706) can be determined using various methods such as (i) assigning default trust scores to newly configured and provisioned devices, (ii) or dynamically computed using mathematical or statistical formulas that are based on a weighted combination of different factors related to, e.g., the types of IoT devices, a current power profile (relative to a base (anticipated) power profile), devices behaviors (normal, abnormal, etc.). For example, in some embodiments, a trust score for a given IoT device is computed based on determining a current power consumption profile of the IoT device and comparing the current power consumption profile with historical or baseline power profiles of the IoT device, to thereby what is normal and legitimate behavior of the given IoT device. The anomaly detection techniques can then be utilized to capture any unusual behavior of the given IoT device and update its power consumption trust score accordingly.

The IoT devices are clustered into trust tiers based on their current trust scores (block 708). For example, as noted above, the current trust score for a given IoT device can be matched against the range of trust scores assigned to each trust tier level to determine the proper tier assignment for the given IoT device. The security gateway is updated with the current trust scores and trust tiers so that the security gateway can select proper authentication procedures that provide proper security levels for authenticating the sensor devices (block 710). As noted above, in some embodiments, each trust tier is associated with authentication methods or protocols which are associated with various types of IoT devices, wherein each trust tier thereby defines a level of authentication to be applied to the IoT devices that are included within the trust tier.

In other embodiments, trust scores are computed using machine learning models that are trained to determine trust scores for IoT devices (e.g., sensor nodes) based on various features related to, e.g., power consumption of the IoT devices and communications/interactions between peer IoT devices operating within a given IoT network environment. In some embodiments, different machine learning models are utilized to compute trust scores of IoT devices for different network topologies (e.g., different types of network configurations, different types of IoT devices operating within a given network environment, etc.). The trust score models comprise any type of machine learning model or classifier (e.g., neural networks) which is suitable for the given application, and generated/trained using various types of machine learning techniques (e.g., deep learning training methods).

Figure 8:
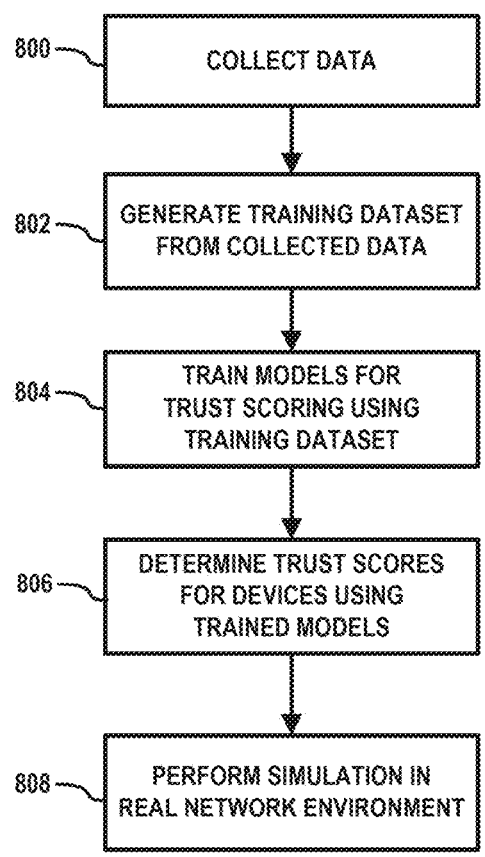
FIG. 8 is a flow diagram of a method for generating trust score models, according to an exemplary embodiment of the disclosure.

FIG. 8 is a flow diagram of a method for generating trust score models, according to an exemplary embodiment of the disclosure. The process begins by collecting data (block 800) from which various features are extracted or otherwise computed using the collected data to generate one or more training datasets for training one or more machine learning trust score models for different network topologies (block 802). Depending on the types of features used to train and build machine learning models, the collected data may include information such power consumption profiles of IoT devices (e.g., baseline profiles, custom-generated profiles, etc.), network topologies (e.g., types of IoT devices and connections between IoT devices within a given network environment, etc.), and other information regarding learned behavior patterns (e.g., normal, abnormal, etc.) of configured IoT devices within a given network environment, etc.

One or more trust scoring models are trained using one or more training datasets (block 804). In some embodiments, different trust scoring models are generated for different network topologies, wherein the trained trust scoring models are utilized to determine trust scores for IoT devices (e.g., sensor nodes) operating within IoT device networks with the associated topologies (block 806). The trained model for a given network topology can be tested and verified for accuracy using a simulated real network environment having the given network topology (block 808).

As noted above, a trust scoring model can be trained for a given network topology using feature data related to peer-to-peer node interactions (e.g., IoT device communications) within the given network topology. For example, in some embodiments, trust score models are constructed using feature selection and model training techniques which are based, at least in part, on techniques disclosed in the article by H. Mayadunna et al., entitled: "A Trust Evaluation Model for Online Social Networks," 2018 National Information Technology Conference, October 2018, which is incorporated herein by reference. In particular, assume that the trust value between node "a" and node "b" in a given network is to be analyzed, the following parameters are defined: (i) T(a) denotes the set of neighbor nodes of node a; (ii) T(b) denotes the set of neighbor nodes of node b, (iii) k(a) denotes the number of neighbor nodes of node a, and (iv) k(b) denotes the number of neighbor nodes of node b. In this example, T (a) is a set or a list of neighbor nodes of node a represented by unique node IDs, while k(a) is the number of neighbor nodes within T(a). Similarly, T(b) is a set or a list of neighbor nodes of node b represented by unique node IDs, while k(b) is the number of neighbor nodes within T(b). Furthermore, in some embodiments, two nodes are deemed to be neighbor nodes within a given network topology when there is direct communication between the two nodes (e.g., the two nodes belong to the same physical or virtual link/interface).

In view of the above, one or more of the following features are utilized for constructing a trust scoring model:

Feature 1: The number of neighbor nodes, that is k(a) and k(b). This feature represents a degree of a given node, and is an important attribute of the node. This feature is node or device specific, and offers a view on the importance of a given node or device with regard to the number of neighbor nodes of the given node or device.

Feature 2: The sum and difference between the number of neighbor nodes, that is k(a)+k(b) and k(a)−k(b). This feature represents a simple relationship among the nodes, which provides information related to the interactions between the two nodes a and b. Specifically, the number of neighbors the two nodes have together, the sum of k(a) and k(b) and the difference between the two, k(a)−k(b) viewed from the node a perspective.

Feature 3: Number of common neighbor nodes. The definition is S (CN)=|T(a)∩T(b)|. The larger the number of common neighbor nodes, the more similar the nodes.

Feature 4: Jaccard Index. The definition of this index is:

$$S_{ab}^{Jaccard} = \frac{|T(a) \cap T(b)|}{|T(a) \cup T(b)|}$$

The Jaccard Index (also known as "Intersection over Union" or the Jaccard similarity coefficient compares members for two sets to determine which members are shared and which are distinct. The Jaccard Index provides a measure of similarity for two sets, with a range from 0% to 100%. The Jaccard Index is one of the node trust value indicators that are used.

The training set is constructed after selecting the features. A trust value between nodes (e.g., IoT devices) is replaced by an edge between the nodes. In some embodiments, if there is an edge between two IoT devices, the trust value of the two IoT devices is deemed to be "1", otherwise the trust value of the two IoT devices is zero. Moreover, in some embodiments, given that the number of device pairs which have no edge is much larger than the number of device pairs which have an edge, and that the trust value of device pairs which are far away from each other in the network is relatively small, in some embodiments, only the device pairs whose distances are less than or equal to 3 are considered. This information is considered for label information.

For each node pair, after obtaining the feature information: f={f1, f2 . . . fn} and the label information L, we can use this information as a training sample of the training set and use logistic regression to train a trust scoring machine learning model. In particular, for logistic regression, the trust scoring model comprises a vector $\theta=\{\theta_1, \theta_2, \ldots \theta_n\}$, which represents the weight of the respective features f={f1, f2 . . . fn}. For samples (θ, L), the logistic regression function has the following form:

$$h_\theta(f) = g(\theta^T f) = g(\theta_1 f_1 + \theta_2 f_2 + \ldots + \theta_n f_n) = L \text{ where}$$

$$g(x) = \frac{1}{1+e^{-x}}.$$

A process for training the a trust score model using logistic regression is then performed, for example, using the methods as disclosed in the above-incorporated article by H. Mayadunna et al., or using other techniques as noted above.

It is to be appreciated that the network security techniques described above afford various benefits. For example, the network security techniques can be implemented in current infrastructures without modification. The security techniques can be embedded as add-on technique to harden the current security solution without loading the system with extra software. The security techniques can be added as a proactive security layer for current solutions. Next generation data centers will be fully connected and serve mostly IoT-related activities, wherein power consumption information can be readily included in the data center vulnerability assessment and risk mitigation. The implementation of the security techniques can be integrated into edge management tools such as VMware Enterprise mobility management product suite. The security techniques are designed for the 'higher orders' of IoT where processors can be instrumented to gather the necessary telemetry data, and can be readily leveraged for current IoT Gateways. Further, by utilizing machine learning and deep learning methods, the security techniques disclosed herein can be implemented at the core data center level or as a service in the Cloud, while deep learning enables continuous learning with the deployment of retrained/updated neural networks.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
collecting power consumption data of a plurality of devices operating within a network;
determining trust scores for the plurality of devices based, at least in part, on the collected power consumption data, wherein the trust score for a device provides a measure of trustworthiness of the device exhibiting normal operating behavior within the network;
assigning each of the plurality of devices into one of a plurality of trust tiers based on the determined trust scores, wherein each trust tier specifies an authentication level for devices assigned to the trust tier; and
applying one or more authentication procedures to authenticate a given device of the plurality of devices operating within the network based on the authentication level specified by the trust tier to which the given device is assigned.

2. The method of claim 1, wherein each trust tier is allocated to a predefined range of trust scores, and wherein each device of the plurality of devices is assigned to a trust tier by determining which trust tier of the plurality of trust tiers has a predefined range of trust scores which includes the determined trust score of the device.

3. The method of claim 1, further comprising:
assigning a default trust score to a newly provisioned device operating within the network; and
assigning the newly provisioned device to one of the plurality of trust tiers based on the default trust score.

4. The method of claim 1, wherein determining trust scores for the plurality of devices further comprises:
determining device interaction patterns between the devices operating within the network; and
determining a trust score for each of the devices based, at least in part, on the determined device interaction patterns.

5. The method of claim 4, wherein the trust score is determined using a trust scoring machine learning model which is trained to determine trust scores using a training dataset comprising features corresponding to device interaction patterns.

6. The method of claim 5, wherein the features corresponding to device interaction patterns are based on device pairs and at least one feature associated with sets of neighbor nodes associated with the device pairs.

7. The method of claim 6, wherein the at least one feature associated with sets of neighbor nodes comprises a number of neighbor nodes of each device of a given device pair.

8. The method of claim 6, wherein the at least one feature associated with sets of neighbor nodes comprises a sum and difference between the number of neighbor nodes of each device of a given device pair.

9. The method of claim 6, wherein the at least one feature associated with sets of neighbor nodes comprises a number of common neighbor nodes between the devices of a given device pair.

10. The method of claim 6, wherein the at least one feature associated with sets of neighbor nodes comprises a value indicative of an intersection of the neighbor nodes of the devices of a given device pair divided by a union of the neighbor nodes of the devices of the given device pair.

11. The method of claim 1, wherein the devices comprise sensor devices operating in a wireless sensor network of an Internet of Things network environment.

12. An article of manufacture comprising a non-transitory processor-readable storage medium having stored therein program code of one or more software programs, wherein the program code is executable by one or more processors to implement a method comprising:
collecting power consumption data of a plurality of devices operating within a network;
determining trust scores for the plurality of devices based, at least in part, on the collected power consumption data, wherein the trust score for a device provides a measure of trustworthiness of the device exhibiting normal operating behavior within the network;
assigning each of the plurality of devices into one of a plurality of trust tiers based on the determined trust scores, wherein each trust tier specifies an authentication level for devices assigned to the trust tier; and
applying one or more authentication procedures to authenticate a given device of the plurality of devices operating within the network based on the authentication level specified by the trust tier to which the given device is assigned.

13. The article of manufacture of claim 12, wherein each trust tier is allocated to a predefined range of trust scores, and wherein each device of the plurality of devices is assigned to a trust tier by determining which trust tier of the plurality of trust tiers has a predefined range of trust scores which includes the determined trust score of the device.

14. The article of manufacture of claim 12, further comprising program code which is executable by the one or more processors to implement a method comprising:
assigning a default trust score to a newly provisioned device operating within the network; and
assigning the newly provisioned device to one of the plurality of trust tiers based on the default trust score.

15. The article of manufacture of claim 12, wherein determining trust scores for the plurality of devices further comprises:
determining device interaction patterns between the devices operating within the network; and
determining a trust score for each of the devices based, at least in part, on the determined device interaction patterns.

16. The article of manufacture of claim 15, wherein the trust score is determined using a trust scoring machine learning model which is trained to determine trust scores using a training dataset comprising features corresponding to device interaction patterns, wherein the features corresponding to device interaction patterns are based on device pairs and features associated with sets of neighbor nodes associated with the device pairs.

17. The article of manufacture of claim 16, wherein the features associated with sets of neighbor nodes comprise:
 a first feature comprising a number of neighbor nodes of each device of a given device pair;
 a second feature comprising a sum and difference between the number of neighbor nodes of each device of the given device pair;
 a third feature comprising a number of common neighbor nodes between the devices of the given device pair; and
 a fourth feature comprising a value indicative of an intersection of the neighbor nodes of the devices of the given device pair divided by a union of the neighbor nodes of the devices of the given device pair.

18. A server node, comprising:
 at least one processor; and
 system memory configured to store program code, wherein the program code is executable by the at least one processor to perform a process which comprises:
 collecting power consumption data of a plurality of devices operating within a network;
 determining trust scores for the plurality of devices based, at least in part on, the collected power consumption data, wherein the trust score for a device provides a measure of trustworthiness of the device exhibiting normal operating behavior within the network;
 assigning each of the plurality of devices into one of a plurality of trust tiers based on the determined trust scores, wherein each trust tier specifies an authentication level for devices assigned to the trust tier; and
 applying one or more authentication procedures to authenticate a given device of the plurality of devices operating within the network based on the authentication level specified by the trust tier to which the given device is assigned.

19. The server node of claim 18, wherein each trust tier is allocated to a predefined range of trust scores, and wherein each device of the plurality of devices is assigned to a trust tier by determining which trust tier of the plurality of trust tiers has a predefined range of trust scores which includes the determined trust score of the device.

20. The server node of claim 18, wherein determining trust scores for the devices comprises:
 determining device interaction patterns between the devices operating within the network; and
 determining a trust score for each of the devices based, at least in part, on the determined device interaction patterns;
 wherein the trust score is determined using a trust scoring machine learning model which is trained to determine trust scores using a training dataset comprising features corresponding to device interaction patterns, wherein the features comprise:
 a first feature comprising a number of neighbor nodes of each device of a given device pair;
 a second feature comprising a sum and difference between the number of neighbor nodes of each device of the given device pair;
 a third feature comprising a number of common neighbor nodes between the devices of the given device pair; and
 a fourth feature comprising a value indicative of an intersection of the neighbor nodes of the devices of the given device pair divided by a union of the neighbor nodes of the devices of the given device pair.

* * * * *